United States Patent
Davis (10) Patent No.: US 6,920,842 B1
(45) Date of Patent: Jul. 26, 2005

(54) FEEDER AND METHODS FOR DISPENSING FEED FOR BIRDS AND/OR ANIMALS

(75) Inventor: Stephen W. Davis, Fort Collins, CO (US)

(73) Assignee: FeatherTech, Inc., Wellington, CO (US)

(*) Notice: Subject to any disclaimer, the term of this patent is extended or adjusted under 35 U.S.C. 154(b) by 0 days.

(21) Appl. No.: 10/651,470

(22) Filed: Aug. 29, 2003

(51) Int. Cl.$^7$ ............................................. A01K 5/00

(52) U.S. Cl. ....................... 119/53; 119/52.4

(58) Field of Search ................ 119/52.1, 52.4, 119/53, 57.91

(56) References Cited

U.S. PATENT DOCUMENTS

| | | | | |
|---|---|---|---|---|
| 570,569 A | * | 11/1896 | Smith | 119/53 |
| 1,537,337 A | * | 5/1925 | De Angulo | 119/80 |
| 2,602,420 A | * | 7/1952 | Peterson | 119/53 |
| 5,233,941 A | * | 8/1993 | Ayliffe et al. | 119/57.91 |
| 6,082,300 A | * | 7/2000 | Futch | 119/51.11 |

FOREIGN PATENT DOCUMENTS

GB 2 157 146 A * 10/1985 ............ A01K 5/00

OTHER PUBLICATIONS

All Season Feeders, print out from website—www.AllSeasonFeeders.com—dated Aug. 12, 2003, 2 pages.
Lehman Feeder Manufacturers—printout from website—www.lehmanfeeders.com/turkeyfeeders.htm—dated Aug. 12, 2003, 5 pages.
West Texas Game Feeders, printout from website—http://westtexasgamefeeders.com/WTGF_TURKEY.html—dated Aug. 12, 2003, 3 pages.
Superior Fiberglass, printout from website—http:/www.superiorfirberglassinc.com/html/huntin_products.html—dated Aug. 12, 2003, 4 pages.
Action Game Feeders, print out from website—http://www.actiongamefeeders.com/turkey-16.html, dated Aug. 12, 2003, 3 pages.
Outback Feeders, printout from website—http://www.outbackfeeders.com/turkey.htm, dated Aug. 12, 2003, 2 Pages.
Koala Wildlife Feeder, printout from website https://seerver15.hypermart.net/johnn/turkey_feeder.htm, dated Aug. 12, 2003, 2 pages.
Linda E. Gallagher, Feeders For the Future, print out from website—http://www.mwtha.net/Pages/feeder_for_the_future.htm, Aug. 12, 2003, 3 pages.
Remington Wildlife Feeders, printout from website www.remingtonfeeders.com, dated Apr. 22, 2003, 4 pages.
East Texas Feeders, printi out from website—http://www.easttexasfeeders.com/turkeyfeeders.html, dated Aug. 12, 2003, 3 pages.
Texas Hunter Accessories and Texas Hunter EZ Lift—portion of catalog—undated.

* cited by examiner

Primary Examiner—Robert P. Swiatek
(74) Attorney, Agent, or Firm—Kirkpatrick & Lockhart Nicholson Graham LLP (57) ABSTRACT

A feed dispensing apparatus for use with a conventional container. The feed dispensing apparatus may include a dispensing member attachable to the container adjacent to the bottom thereof. The dispensing member may have a perimeter with at least one access opening therethrough. The dispensing member may be clamped to the container or be configured to removably support the container thereon. A leg assembly for supporting the container above a surface or the ground may also be provided. An adjustable drop tube may be provided to adjust the rate of feed that is flows through a hole in the bottom of the container onto a bottom tray of the dispensing member.

46 Claims, 7 Drawing Sheets

FEEDER AND METHODS FOR DISPENSING FEED FOR BIRDS AND/OR ANIMALS

BACKGROUND OF THE INVENTION

Field of the Invention

The invention relates to apparatuses and methods for dispensing feed and, more particularly, to apparatuses and methods of dispensing feed, feed supplements, grain, seed, etc. to wild birds and/or wild animals.

DESCRIPTION OF THE INVENTION BACKGROUND

Over the years, a variety of different feeders and methods have been employed to dispense feed, seed, grain, corn, etc. to wild game birds and animals such as, for example, wild turkey, quail, pheasant, deer, etc. Such devices typically employ large containers or reservoirs designed to hold the feed prior to being dispensed therefrom. The feed is typically permitted to exit the container through holes fabricated directly into the container bottom. In some applications, the container is suspended above the ground to permit a battery powered dispensing apparatus to fling the feed or grain in an area around the feeder to permit easier access to the feed by several birds and/or animals at one time.

Those feeders that use a dedicated container or reservoir, however, are cumbersome to store and ship due to the size of the container, many of which may hold 55 gallons or more. Also, such feeders lack means for controlling the dispersal rate of the feed. Thus, there is a need for a feeder apparatus that can be readily employed with commonly available containers such as 55 gallon drums and the like for dispensing wildlife feed, grain, supplements, etc. There is a further need for a feeder that has means for controlling the feed dispersal rate.

SUMMARY

In order to address the above-described needs, one embodiment of the present invention comprises a feed dispensing apparatus for use with a feed containing container that has bottom that has at least one hole therethrough. This embodiment of the present invention comprises a dispensing member that is attachable to the container adjacent to the bottom of the container. The dispensing member has a perimeter with at least one access opening therethrough and a bottom tray for collecting feed that flows through the holes in the bottom of the container. The dispensing member may be clamped to the container. In addition, this embodiment may include a leg assembly for supporting the container above a surface. The dispensing member may be attached to the leg assembly and the leg assembly may be clamped to the container. The dispensing member may have a perimetrical shape that is substantially identical to the perimetrical shape of the container. If desired, a hollow drop tube may also be employed. The drop tube may be suspended through the hole in the bottom of the container and the end of the drop tube be located relative to the bottom tray of the dispensing member such that a desired flow of feed through the tube onto the tray is achieved. In one embodiment, the drop tube is telescopic.

Another embodiment of the present invention comprises a feed dispensing kit for use with a container having a bottom. The kit may include a dispensing member having a perimeter with at least one access hole therethrough. The dispensing member may have a bottom tray and attachment apparatus is used to attach the dispensing member to the container such that the dispensing member is adjacent the bottom of the container and the bottom tray is oriented to catch feed that falls through a hole provided in the bottom of the container.

Yet another embodiment of the present invention may comprise a method of fabricating a feeder. The method may include forming at least one hole in a bottom of a container and attaching a dispensing member having a bottom and a perimeter with at least one access opening therethrough to the container such that feed exiting the container through the hole is received on the bottom tray of the dispensing member. One embodiment of the method includes clamping the dispensing member to the container. Another embodiment includes supporting the bottom of the container above a surface. Still another embodiment may include attaching a leg assembly to the container such that the leg assembly supports the container above the surface. Yet another embodiment may include controlling flow of feed exiting through the hole in the bottom of the container. The controlling may comprise inserting a hollow dispensing tube into the hole in the bottom of the container such that a bottom end protrudes therefrom and moving the bottom end of the hollow dispensing tube relative to the bottom tray of the dispensing member to a position wherein a desired amount of feed flows onto the bottom tray.

The reader will appreciate the foregoing details and advantages of the present invention, as well as others, upon consideration of the following detailed description of embodiments of the invention. The reader also may comprehend such additional advantages and details of the present invention upon carrying out or using the invention.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE INVENTION

Referring now to the drawings for the purposes of illustrating the present embodiments of the invention only and not for the purposes of limiting the same, the Figures show a feeder assembly 10 that employs various aspects and components of one embodiment of the present invention. The feeder 10 may be used to dispense a variety of different types of feed such as, for example, bird seed, corn and other grains, commercially prepared feed and feed supplements, etc. that may be ingested by, for example, wild birds (e.g., wild turkey, quail, pheasant, ducks, geese, etc.) and/or wild animals (dear, bear, elk, wild boar, etc.). It is conceivable, however, that the unique and novel features of the various embodiments of the present invention may also be effectively employed for dispensing seed, feed, feed mixes, etc. to domestic birds and livestock if desired. Thus, the various embodiments of the present invention should not be limited to applications primarily directed to feeding wild birds and other wildlife. As used herein, the term "feed" shall encompass grains, seeds and commercially prepared feed mixes and feed supplements for all types of wild birds, wild animals, domestic birds and domestic livestock that may be gravity fed or otherwise dispensed from a container.

Figure 1:
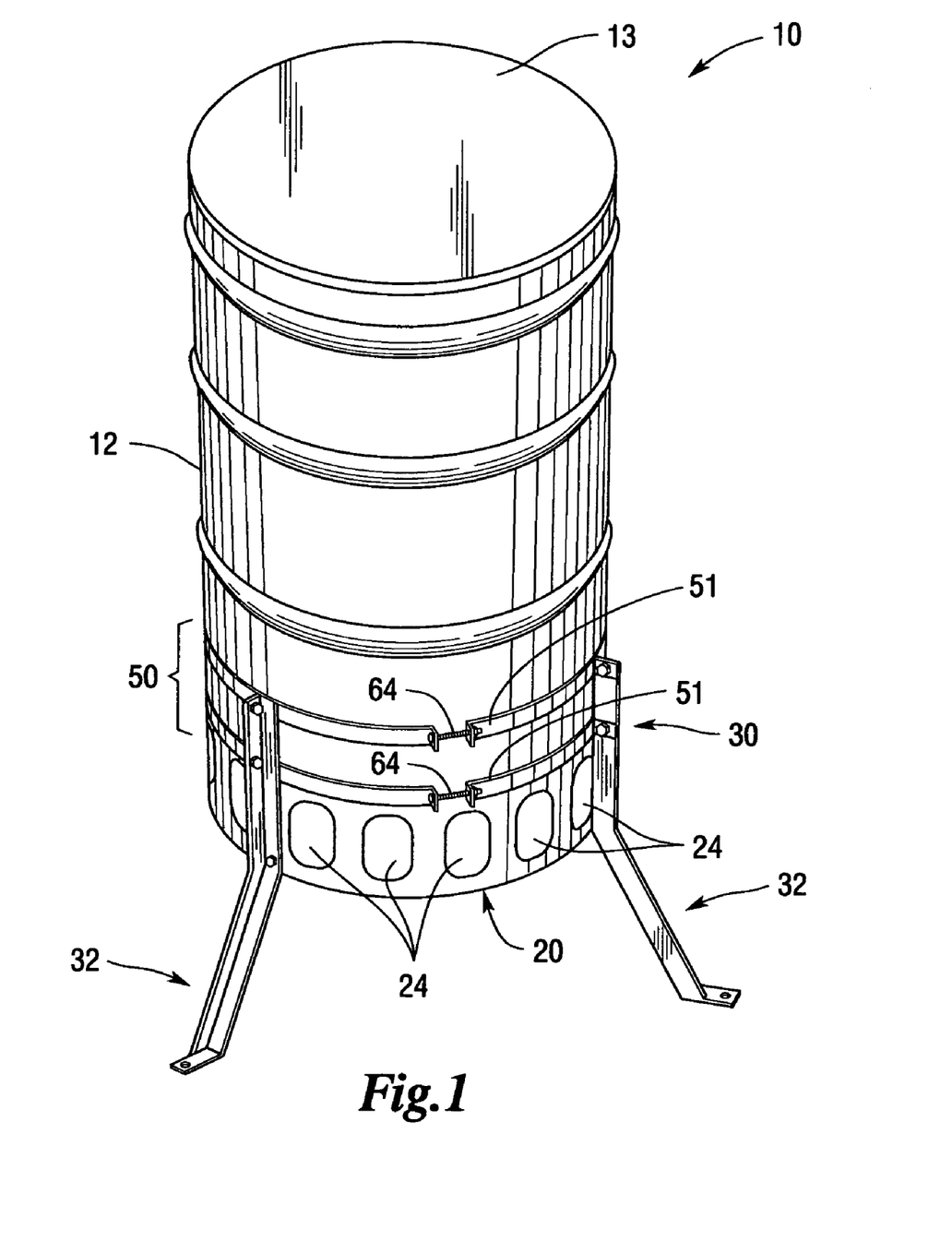
FIG. 1 is a perspective view of a feeder embodiment of the present invention employing a conventional container such as a 55 gallon drum.

As illustrated in FIG. 1, certain aspects of various embodiments of the present invention make it well suited for use with a conventional container 12 such as, for example, a 55 gallon drum. The drum 12 depicted in FIG. 1 is a conventional 55 gallon drum of steel construction that has a removable lid or closure member 13. The various embodiments of the present invention, however, may be employed with a variety of other sizes, shapes and types of containers without departing from the spirit and scope of the present invention. For example, the container may be fabricated from plastic or other materials and hold a greater or lesser amount of material than would a 55 gallon drum.

Figure 2:
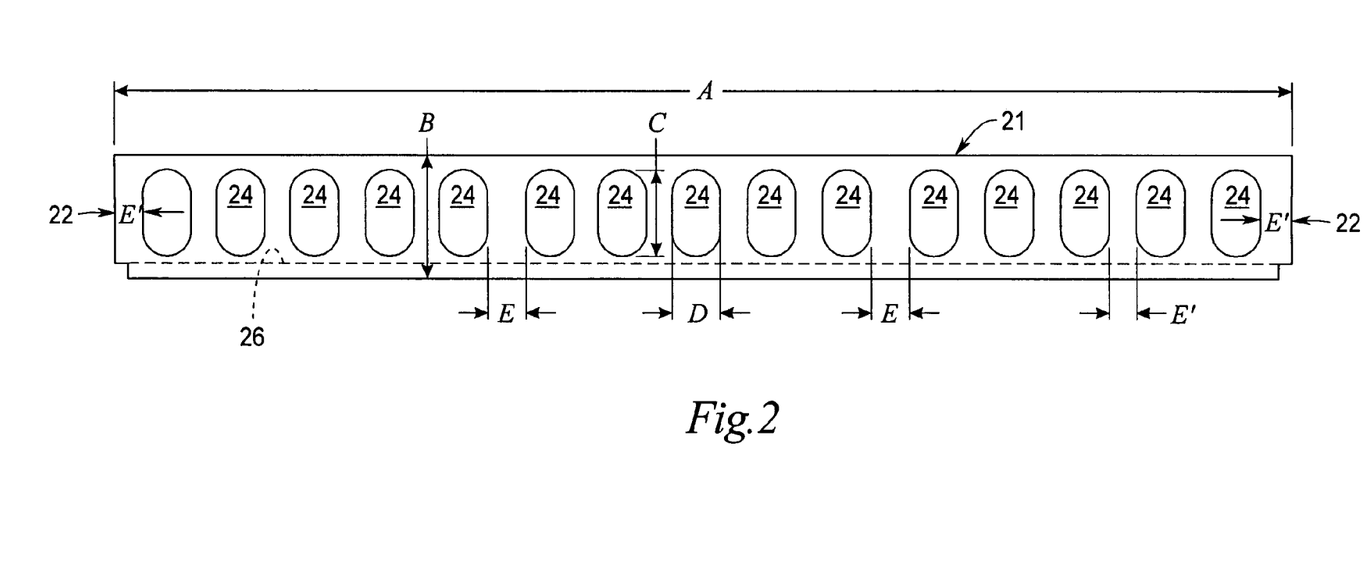
FIG. 2 is a side view of a dispensing member of one embodiment of the present invention prior to being formed into a ring.

One embodiment of the present invention includes a dispensing ring 20 which may be made from, for example, 16 gauge sheet metal, steel, stainless steel, etc. and have a perimetrical shape that is substantially similar to the perimetrical shape of the container 12. The dispensing ring 20 may be painted, powder coated, etc. to protect it from the elements. Dispensing ring 20 may also be conceivably fabricated from plastic or the like. FIG. 2 illustrates a layout for a dispensing member 21 used to form a dispensing ring 20 of one embodiment of the present invention. As can be seen in that Figure, attachment tabs 22 may be provided on each end of the dispensing member 21. In this embodiment, the dispensing member 21 may be provided with a length "A" such that when the two tabs 22 are overlapped and joined together by, for example, spot welding, screws, rivets, etc., the diameter of the ring 20 formed thereby is such that it may be received within the area formed by the downwardly protruding bottom flange 14 of a container 12. See FIG. 3. For example, in one embodiment, a dispensing member 21 having a length "A" of 5'-10¾" will form a ring (having an outside diameter of approximately 22¼") that fits snugly within the area defined by the downwardly projecting bottom flange 14 and the bottom 16 of a conventional steel 55 gallon drum. Thus, such arrangement permits the container 12 to be removably supported on the dispensing ring if so desired. In applications employing a container which lacks such a downwardly protruding bottom flange, the dispensing ring 20 may be sized such that it has a diameter that is substantially equal to the diameter of the container 12. In other embodiments of the present invention, the dispensing ring 20 may be fabricated from a plastic material and be formed by gluing, riveting, etc. the ends together. In other embodiments, the dispensing ring may be of molded construction.

Figure 3:
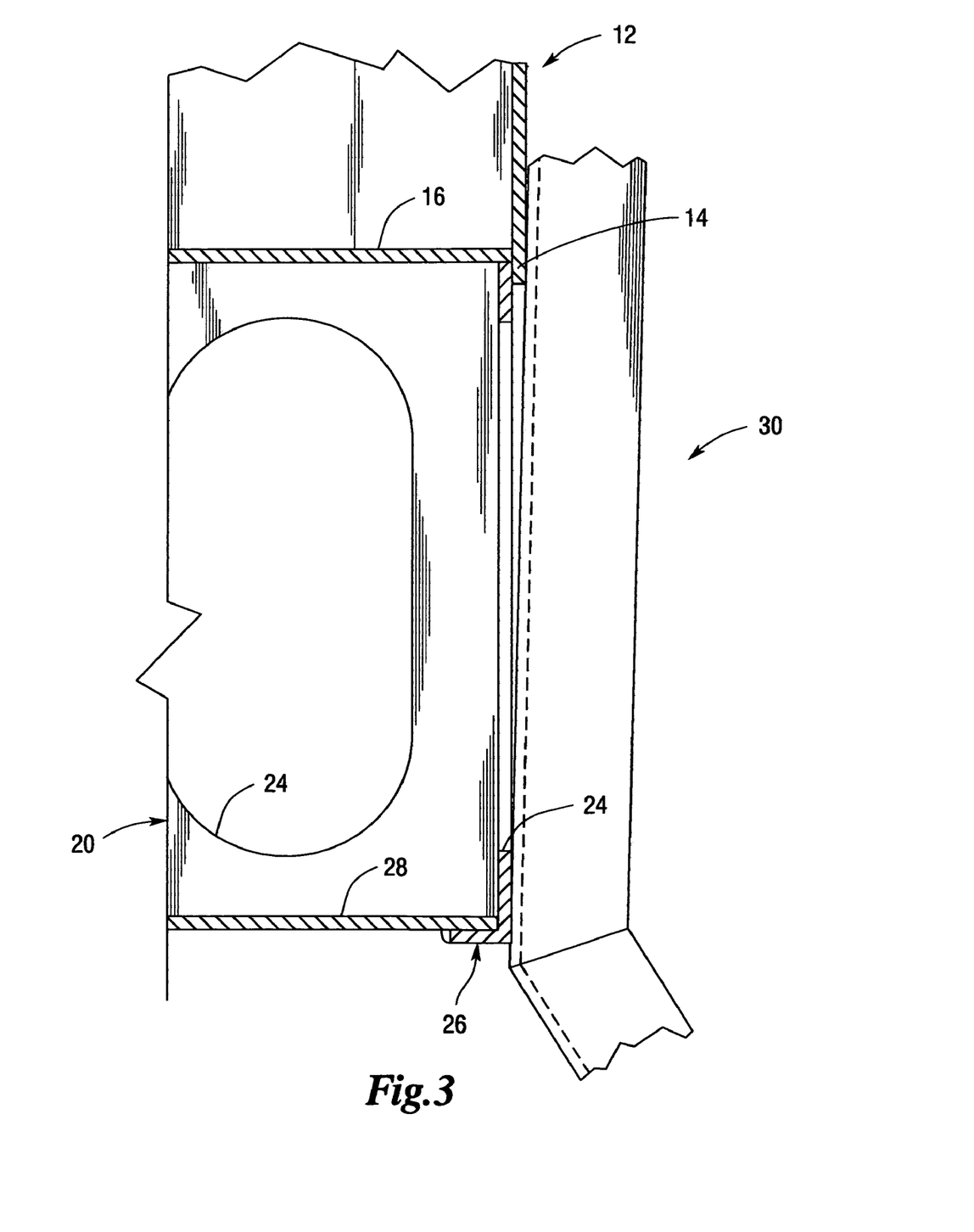
FIG. 3 is a partial cross-sectional view of a dispensing ring and leg assembly of one embodiment of the present invention supporting a conventional container thereon.

In the embodiment depicted in FIGS. 2 and 3, a bottom lip portion 26 is integrally formed around the lower edge of dispensing ring 20. A bottom tray 28 is then attached to the lip 26, or end of the dispensing ring 20 by suitable fastening methods such as, for example, welding, screwing, riveting, gluing, etc. See FIG. 3.

As shown in FIG. 2, a series of access holes 24 may be provided in the perimeter of dispensing member 21. In one embodiment wherein the dispensing ring has a height "B" of 7", 15 dispensing holes 24 are provided. In this embodiment, each hole 24 may have a height "C" of 5" and a width "D" of 2¾". The spaces "E" and "E" between the holes 24 may be 2½" and 1¾", respectively. This dispensing hole configuration has been found to be well-suited for enabling wild turkey to access the feed that drops onto the bottom tray 28 while limiting the accessibility of non-target animals such as deer, etc. However, other hole shapes, sizes, numbers and configurations may be used, depending upon the target animal.

Figure 4:
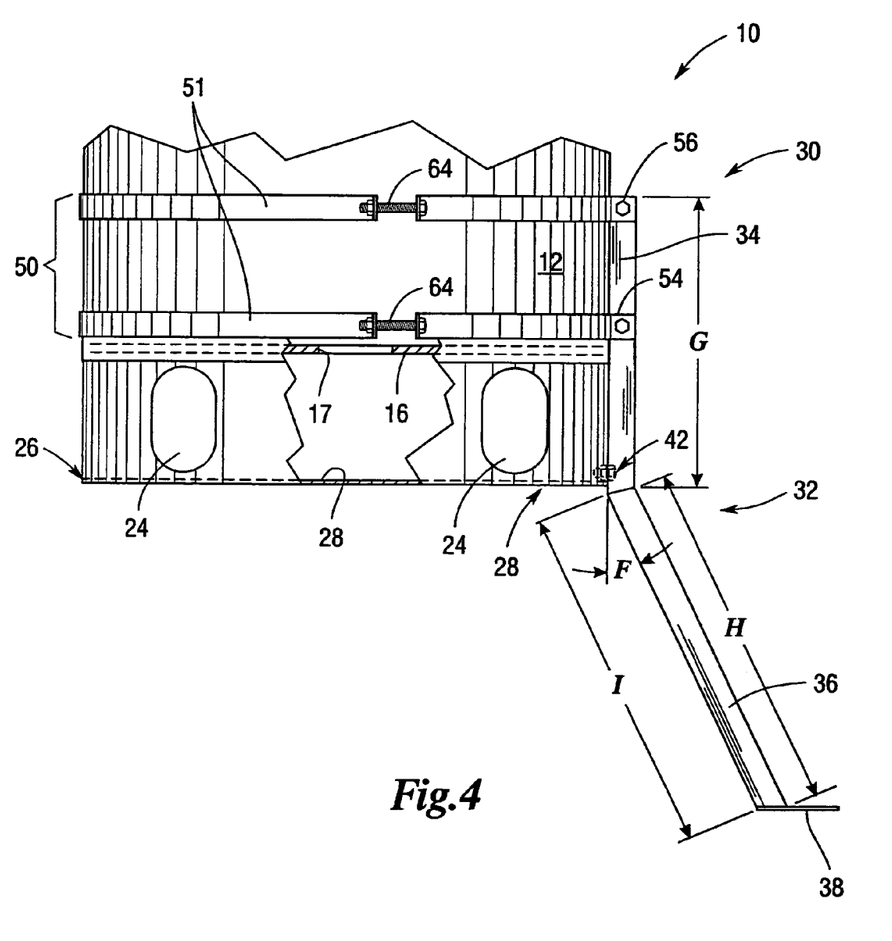
FIG. 4 is a partial elevational view of one embodiment of the present invention supporting a container thereon.
Figure 5:
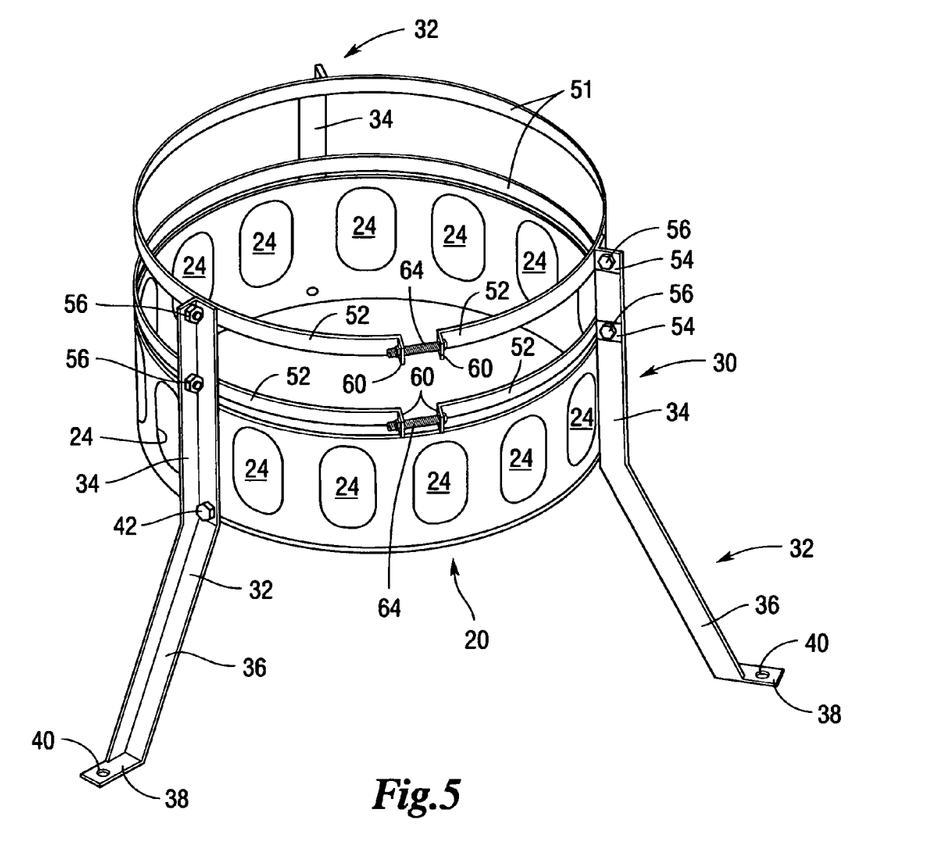
FIG. 5 is a perspective view of a dispensing ring and leg assembly of one embodiment of the present invention.

In one embodiment, the dispensing ring 20 may be coupled to the container 12 by a leg assembly generally designated as 30. The leg assembly 30 may include legs 32 that may be fabricated from, for example, metal angles that are configured as shown in FIGS. 4 and 5. Leg assembly 30 may be painted, powder coated, etc. to protect it from the elements. In particular, each leg 32 may have an upper portion 34 and a lower portion 36 that is oriented at an angle "F" relative to the upper portion 34. In one embodiment, for example, angle "F" may be approximately 24 degrees. In other embodiments, legs 32 are substantially straight and do not have an angled portion. In one embodiment, the upper portion may have a length "G" of approximately 1'-1" and lower leg portion 36 may have lengths "H" and "I" of 1'-4" and 1'-3¾", respectively. Other shapes, numbers and sizes and configurations of legs may be employed without departing from the spirit and scope of the present invention. Also in this embodiment, a foot pad 38 may be attached or formed from the bottom leg portion 36 as shown in FIG. 5. One or more mounting holes 40 may be provided through each foot pad 38 to enable an anchor member (i.e., stake, nail, etc.) to be inserted therethrough to enable the feeder 10 to be anchored to the ground, platform, etc.

As can be seen in FIGS. 4 and 5, the upper leg portion 34 of each leg 32 may be attached to the dispensing ring 20 by, for example, screws or bolts 42. However, the upper portions 34 of the legs 32 may be attached to the dispensing ring 20 by other suitable fastening methods, such as welding, riveting, gluing, etc. In this embodiment, to facilitate fastening of the leg assembly 30 and the dispensing ring 20 to the container 12, at least one fastening strap 50 is employed.

In the embodiment depicted in FIGS. 4 and 5, a clamping assembly 50 may be employed to clamp the leg assembly to the container or to merely support the container on the dispensing ring. Clamping assembly 50 may comprise one or more fastening straps 51 which may each comprise, for example, a single 1"×⅛" steel strap that is attached to the upper portion 34 of each leg 32 by, for example, welding, screws, rivets, etc. Fastening straps 51 may also comprise a series of strap segments 52 that have a tab 54 folded on each end for attachment to a corresponding leg 32 by, for example, bolts 56. Straps 51 may be fabricated from other suitable materials and be attached to the legs 32 by other suitable means, such as, welding, rivets, gluing, etc. For example, fastening straps could conceivably be fabricated from fabric and be attached to the legs by bolts, screws, etc. As most particularly shown in FIG. 5, each strap 51 has two free ends 60 that have a hole therethrough for receiving a corresponding tightening device in the form of a tightening bolt 64. Thus, in this embodiment, the dispensing ring 20 and leg assembly 30 are clamped to the container 12 by the straps 51.

To use this embodiment of the present invention, at least one dispensing hole 17 is provided through the bottom 16 of the container 14 to permit the feed which is in the container 12 to drop through the bottom of the container 12 onto the bottom tray 28 of the dispensing ring 20. The size and number of holes may be designed and arranged to achieve a desired flow of feed onto the bottom tray 28. Birds and/or animals are then are able to access the feed falling onto the bottom tray 28 through the holes 24 in the perimeter of the dispensing ring 20.

To advantageously control the amount or rate of feed dropping onto the bottom tray 28 of the dispensing ring 20, an adjustable drop tube 70 may be provided. More particularly and with reference to FIGS. 6 and 7, the drop tube 70 may be telescopic in nature and include a hollow tube portion 72 and a lower adjustment sleeve 74. The hollow tube portion 72 is sized to extend through the hole 17 in the bottom 16 of the container 12. The upper end of the tube portion 72 may have a flanged portion 73 formed thereon that has a larger diameter "J" than the diameter "K" of hole 17 for suspending the drop tube from the bottom of the container as shown. Sleeve 74 is sized to slidably telescope relative to the tube portion 72 and be retained in a desired position by, for example, one or more set screws 80.

Figure 6:
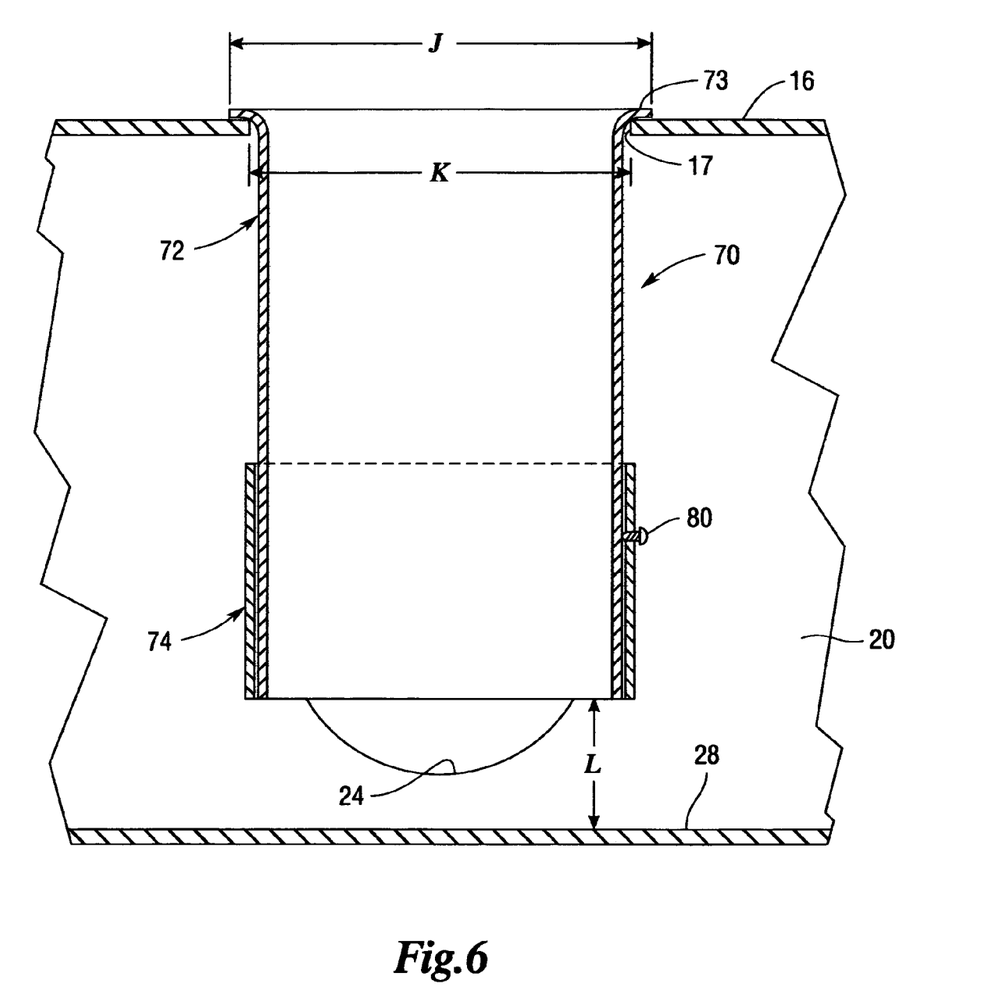
FIG. 6 is a partial cross-sectional view of a dispensing ring and drop tube assembly used in connection with a conventional container.
Figure 7:
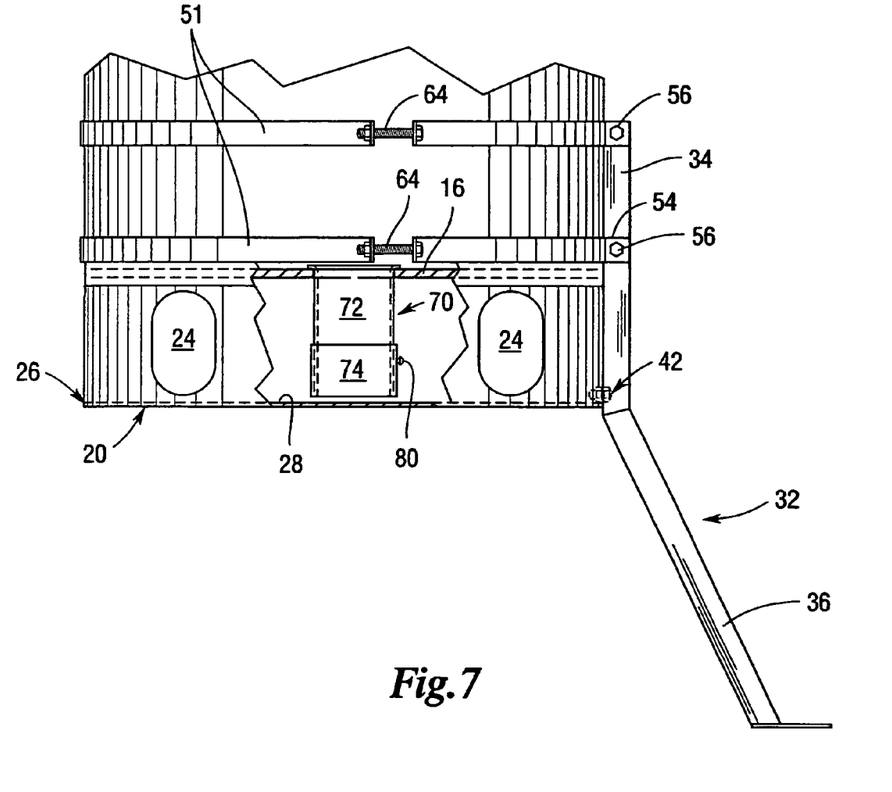
FIG. 7 is a partial elevational view of the embodiment of the present invention depicted in FIG. 6.

To use the telescoping drop tube 70 of this embodiment, the user forms a hole 17 in the bottom 16 of the container 12 that has a diameter "K" that is large enough to permit the hollow tube portion 72 to extend therethrough, yet is smaller in diameter than diameter "J" of the upper flange 73, such that the tube portion 72 may be suspended from the bottom 16 of the container 12 as shown in FIG. 6. The telescopic sleeve 74 is then slid onto the tube portion 72 to a desired location thereon and the set screw(s) 80 are tightened to retain it in position. Portions 72 and 74 may be fabricated from metal tubing or the like or they may be fabricated (casted) from metal or plastic. The user may then place the container 12 onto the dispensing ring 20 as shown in FIGS. 1 and 3, as then tighten the tightening bolt(s) 64 to clamp the dispensing ring 20 and leg assembly 30 to the container 12. The reader will appreciate that the order of these assembly actions may vary. For example, the dispensing ring 20 and leg assembly 30 may be coupled to the container 12 and then the drop tube portion 72 is inserted through the hole 17. For those embodiments that have holes 24 in the dispensing ring 20 that are large enough to permit one to reach therethrough to manipulate the sleeve 74, the distance "L" between the bottom of sleeve and the bottom tray 28 of the dispensing ring 20 may be adjusted after the dispensing ring 20 and leg assembly 30 have been coupled to the container. See FIG. 6. The user simply loosens the set screw(s) 80 and slides the sleeve 74 on the tube 72 until a desired distance "L" is achieved. The user then places the feed into the container 12 and by altering the amount of clearance "L" between the end of the sleeve 74 and the bottom tray 28, the user can control the rate at which the feed disperses onto the bottom tray 28 through the drop tube 70. The birds and/or animals access the feed through the holes 24 in the dispensing ring 20.

In another embodiment, the drop tube 70 may be sized such that the end thereof is a desired distance from the bottom tray 28 when the drop tube is installed in the above-described manner. Thus, the bottom sleeve may not be required in that embodiment.

A variety of different variations on the foregoing described embodiment are encompassed by various embodiments of the present invention. For example, for those applications wherein it is desirable to suspend the container from a structure such as a tree, etc., the lower leg portions may be omitted. The reader will appreciate that the above-described strap arrangement permits the dispensing ring and leg assembly to be attached to the container without forming additional fastening holes in the container which could permit the infiltration of moisture into the container. However, other fastening arrangements could be employed. The leg assembly and dispensing ring could be attached to the container by, for example, welding, screws, rivets, glue etc. The shape and size of the dispensing ring may be tailored to the shape and size of the container with which it is to be used. It is conceivable that the dispensing ring 20 may be sized to support the container thereon without being attached to the container. If legs are employed, the legs may simply be attached to the dispensing ring 20 and not to the container. Thus, in such embodiment, the container simply sits on the dispensing ring.

The size and number of dispensing holes 24 provided in the dispensing ring 20 may be tailored to the type of feed being dispensed and the type of animal or bird to be fed, so that access by non-target animals is limited. It is also conceivable that more than one dispensing tube 70 may be employed in a single container to achieve a desired dispersal rate on the bottom tray 28. It is also conceivable that one or more dispensing tubes could be employed along with one or more additional holes (without such tubes) through the bottom of the container to achieve a desired drop and dispersal of the feed on the bottom tray 28.

Another advantage provided by various embodiments of the present invention is the ability for a supplier of the present invention to supply various embodiments of the present invention in the form of a kit that can be used in connection with conventional types of containers such as conventional drums and the like which are readily accessible all over the country, without having to ship the container to the purchaser. The supplier can ship the kit to the user and the user can supply the container. This avoids additional shipping costs which could be significant when large containers are involved.

The invention which is intended to be protected is not to be construed as limited to the particular embodiments disclosed. The embodiments are therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. Feed dispensing apparatus for use with a feed containing container having a bottom with at least one hole therethrough, said feed dispensing apparatus comprising:
    a dispensing member attachable to the container adjacent to the bottom of the container, said dispensing member having a perimeter with at least one access opening therethrough and a bottom tray for collecting feed that flows through the at least one hole in the bottom of the container;
    a leg assembly attachable to the container for supporting the container and dispensing member above a surface; and
    at least one clamp assembly for attaching said leg assembly to the container.

2. The feed dispensing apparatus of claim 1 wherein said dispensing member is attached to said leg assembly and wherein said at least one clamping assembly comprises:
    at least one strap sized to extend around the perimeter of the container; and
    a tightening device cooperating with each said at least one strap to tighten the at least one strap around the perimeter of the container.

3. The feed dispensing apparatus of claim 2 wherein said strap is fabricated from metal and said tightening device comprises a bolt.

4. The feed dispensing apparatus of claim 1 further comprising a dispensing tube having a portion sized to extend through the hole in the bottom of the container and a top flanged portion.

5. The feed dispensing apparatus of claim 4 wherein said dispensing tube is telescopic.

6. The feed dispensing apparatus of claim 5 wherein said dispensing tube comprises:
a hollow tube member having a lower end sized to extend through the hole in the bottom of the container and a flanged upper end having a diameter that is larger than a diameter of the hole through which the lower end extends;
a hollow sleeve slidably received on the lower end of the hollow tube member; and
at least one retainer for retaining the sleeve in a desired position on the hollow tube member.

7. The feed dispensing apparatus of claim 6 wherein said at least one retainer comprises a set screw.

8. The feed dispensing apparatus of claim 1 wherein the container has a perimetrical shape and downwardly extending bottom flange and wherein said dispensing member has a perimetrical shape that is substantially similar to the perimetrical shape of the container and is sized to be received within an area defined by the downwardly extending bottom flange and bottom of the container.

9. A feeder comprising:
a container having a perimetrical shape and bottom with at least one hole therethrough;
a leg assembly attached to the container for supporting said container bottom above a surface; and
a dispensing member with at least one access opening therethrough and a bottom tray, said dispensing member coupled to said leg assembly such that when said leg assembly is coupled to said container, said dispensing member is adjacent said bottom of the container.

10. The feeder of claim 9 wherein said leg assembly is attached to the container by at least one clamping assembly.

11. The feeder of claim 10 wherein said at least one clamping assembly comprises:
a strap sized to extend around the perimeter of the container; and
a tightening device cooperating with each said strap to tighten the strap around the perimeter of the container.

12. The feeder of claim 11 wherein said strap is fabricated from metal and said tightening device comprises a bolt.

13. The feeder of claim 9 further comprising a dispensing tube having a portion sized to extend through the hole in the bottom of the container.

14. The feeder of claim 9 wherein said dispensing tube is telescopic.

15. The feeder of claim 14 wherein said dispensing tube comprises:
a hollow tube member having a lower end sized to extend through the hole in the bottom of the container and a flanged upper end having a diameter that is larger than a diameter of the hole through which the lower end extends;
a hollow sleeve slidably received on the lower end of the hollow tube member; and
at least one retainer for retaining the sleeve in a desired position on the hollow tube member.

16. The feeder of claim 15 wherein said at least one retainer comprises a set screw.

17. The feeder of claim 9 wherein said container has a downwardly extending bottom flange and wherein said dispensing member has a perimetrical shape that is substantially similar to the perimetrical shape of the container and is sized to be received within an area defined by the downwardly extending bottom flange and bottom of the container.

18. A feed dispensing kit for use with a container having a bottom, said kit comprising:
a dispensing member having a perimeter with at least one access hole therethrough, said dispensing member having a bottom tray; and
attachment apparatus for attaching the dispensing member to the container such that the dispensing member is adjacent the bottom of the container and the bottom tray is oriented to catch feed that falls through a hole provided in the bottom of the container, said attachment apparatus comprising:
a strap sized to extend around the perimeter of the container; and
a tightening device cooperating with each said strap to tighten the strap ground the perimeter of the container.

19. The feed dispensing kit of claim 18 wherein said strap is fabricated from metal and said tightening device comprises a bolt.

20. The feed dispensing kit of claim 18 further comprising a leg assembly attachable to the container for supporting the container on a surface.

21. The feed dispensing kit of claim 20 wherein said dispensing member is attached to said leg assembly.

22. The feed dispensing kit of claim 21 wherein said leg assembly is attached to the container by at least one clamp assembly.

23. The feed dispensing kit of claim 22 wherein at least one said clamping assembly comprises:
a strap sized to extend around the perimeter of the container; and
a tightening device cooperating with each said strap to tighten the strap around the perimeter of the container.

24. The feed dispensing kit of claim 23 wherein said strap is fabricated from metal and said tightening device comprises a bolt.

25. The feed dispensing kit of claim 18 further comprising a dispensing tube having a portion sized to extend through the hole in the bottom of the container and a top flanged portion.

26. The feed dispensing kit of claim 25 wherein said dispensing tube is telescopic.

27. The feed dispensing kit of claim 26 wherein said dispensing tube comprises:
a hollow tube member having a lower end sized to extend through the hole in the bottom of the container and a flanged upper end having a diameter that is larger than a diameter of the hole through which the lower end extends;
a hollow sleeve slidably received on the lower end of the hollow tube member; and
at least one retainer for retaining the sleeve in a desired position on the hollow tube member.

28. The feed dispensing kit of claim 27 wherein said at least one retainer comprises a set screw.

29. The feed dispensing kit of claim 18 wherein the container has a perimetrical shape and downwardly extending bottom flange and wherein said dispensing member has a perimetrical shape that is substantially similar to the perimetrical shape of the container and is sized to be received within an area defined by the downwardly extending bottom flange and bottom of the container.

30. The feed dispensing kit of claim 29 wherein the container is a conventional 55 gallon metal drum.

31. Feed dispensing apparatus, comprising:
a container having a bottom with at least one hole therethrough and a downwardly protruding flange extending around at least a portion of the perimeter of the bottom to define an area; and a dispensing member having at least a portion sized to be received within said area and support said container thereon, said dispensing member having a perimeter with at least one access opening therethrough and a bottom tray for collecting feed that flows through the at least one hole in the bottom of the container.

32. The feed dispensing apparatus of claim 31 wherein the dispensing member is attached to the container.

33. The feed dispensing apparatus of claim 31 further comprising a leg assembly attached to the dispensing member.

34. The feed dispensing apparatus of claim 31 wherein the leg assembly is attached to the container.

35. A method of fabricating a feeder, comprising:
forming at least one hole in a bottom of a container;
attaching a dispensing member having a bottom and a perimeter with at least one access opening therethrough to a leg assembly; and
clamping the leg assembly to the container.

36. The method of claim 35 further comprising controlling flow of feed exiting through the hole in the bottom of the container.

37. The method of claim 36 wherein said controlling comprises:
inserting a hollow dispensing tube into the hole in the bottom of the container such that a bottom end protrudes therefrom; and
moving the bottom end of the hollow dispensing tube relative to the bottom tray of the dispensing member to a position wherein a desired amount of feed flows onto the bottom tray; and
retaining the bottom end of the hollow dispensing tube in the position.

38. The method of claim 37 wherein the hollow dispensing tube has an upper portion and a lower portion that telescopes relative to the upper portion and wherein said moving comprises telescoping the lower portion of the hollow dispensing tube on the upper portion of the hollow dispensing tube until said position is achieved.

39. A method of fabricating and using a feeder, comprising:
forming at least one hole in a bottom of a container;
suspending a hollow dispensing tube from the container bottom such that the dispensing tube protrudes through the hole in the bottom; and
supporting the container on a dispensing member having a perimeter with at least one access opening therethrough and a bottom tray for supporting feed that flows through the at least one hole in the bottom of the container.

40. The method of claim 39 wherein the dispensing tube comprises a hollow tube portion and a flanged end that has an outer perimeter that is larger than a perimeter of the hole in the bottom of the container such that when the hollow tube portion of the dispensing tube is inserted through the hole in the bottom of the container the dispensing tube is suspended from the container by the flanged end in contact with the bottom of the container.

41. The method of claim 40 further comprising:
placing feed in the container; and
controlling flow of feed exiting through the dispensing tube.

42. The method of claim 41 wherein said controlling comprises moving a bottom end of the hollow dispensing tube relative to the bottom tray of said dispensing member to a position wherein a desired amount of feed flows onto the bottom tray; and
retaining the bottom end of the hollow dispensing tube in the position.

43. Feed dispensing apparatus for use with a container having a bottom with at least one hole therethrough, said feed dispensing apparatus comprising:
a dispensing member attachable to the container adjacent to the bottom of the container, said dispensing member having a perimeter with at least one access opening therethrough and a bottom tray;
a hollow tube member having a lower end sized to extend through the hole in the bottom of the container and a flanged upper end having a diameter that is larger than a diameter of the hole through which the lower end extends;
a hollow sleeve slidably received on the lower end of the hollow tube member; and
at least one retainer for retaining the sleeve in a desired position on the hollow tube member.

44. Feed dispensing apparatus for use with a container having a bottom with at least one hole therethrough, said feed dispensing apparatus comprising:
a dispensing member attachable to the container adjacent to the bottom of the container, said dispensing member having a perimeter with at least one access opening therethrough and a bottom tray; and
at least one hollow tube member corresponding to at least one of the holes through the container bottom, each hollow tube member having a lower end sized to extend through the corresponding hole in the bottom of the container and a flanged upper end having a diameter that is larger than a diameter of the corresponding hole through which the lower end extends.

45. Feed dispensing apparatus for use with a container having a bottom with at least one hole therethrough, said feed dispensing apparatus comprising:
a dispensing member sized to support the bottom of the container thereon, said dispensing member having a perimeter with at least one access opening therethrough and a bottom tray for collecting feed that flows through the at least one hole in the bottom of the container; and
at least one hollow tube member corresponding to at least one of the holes through the container bottom, each hollow tube member having a lower end sized to extend through the corresponding hole in the bottom of the container and a flanged upper end having a diameter that is larger than a diameter of the corresponding hole through which the lower end extends.

46. The feed dispensing apparatus of claim 45 wherein the container bottom has a flange that projects downwardly from at least a portion of its perimeter and wherein the flange cooperates with the bottom of the container to define a dispensing area and wherein a portion of the dispensing member extends into the dispensing area.

* * * * *

UNITED STATES PATENT AND TRADEMARK OFFICE
CERTIFICATE OF CORRECTION

PATENT NO. : 6,920,842 B1
DATED : July 26, 2005
INVENTOR(S) : Stephen W. Davis

It is certified that error appears in the above-identified patent and that said Letters Patent is hereby corrected as shown below:

Title page,
Item [56], References Cited, OTHER PUBLICATIONS,
"All Season" reference, "www.AllSeasonFeeder.com" should read
-- www.AllSeasonsFeeders.com --.
"Superior Fiberglass" reference, "http:/www.firberglass.com/html/huntin_products"
should read -- http:/www.fiberglass.com/html/hunting_products --.
"Koala Wildlife" reference, "https://seever15.hypermart.net" should read
-- http://server15. hypermart.net --; and "printi out" should read -- print out --.

Column 8,
Line 19, "ground" should read -- around --.

Signed and Sealed this

Twenty-eighth Day of March, 2006

JON W. DUDAS
*Director of the United States Patent and Trademark Office*